United States Patent

Shirai et al.

[11] Patent Number: 5,804,000
[45] Date of Patent: Sep. 8, 1998

[54] PNEUMATIC RADIAL TIRE INCLUDING MAIN GROOVES AND SUB-GROOVES

[75] Inventors: Kenichi Shirai; Toshihiko Suzuki, both of Hiratsuka, Japan

[73] Assignee: The Yokohama Rubber Co., Ltd., Tokyo, Japan

[21] Appl. No.: 849,135

[22] PCT Filed: Oct. 16, 1996

[86] PCT No.: PCT/JP96/02991

§ 371 Date: Jun. 5, 1997

§ 102(e) Date: Jun. 5, 1997

[87] PCT Pub. No.: WO97/14567

PCT Pub. Date: Apr. 24, 1997

[30] Foreign Application Priority Data

Oct. 17, 1995  [JP]  Japan .................................. 7-268876

[51] Int. Cl.[6] .................. B60C 11/12; B60C 101/00; B60C 103/00; B60C 105/00
[52] U.S. Cl. .................. 152/209 R; 152/DIG. 3
[58] Field of Search .................. 152/209 R, 209 D, 152/DIG. 3

[56] References Cited

U.S. PATENT DOCUMENTS

| | | | |
|---|---|---|---|
| 3,682,220 | 8/1972 | Verdier | 152/209 R |
| 4,244,415 | 1/1981 | Peter et al. | 152/209 R |
| 4,784,200 | 11/1988 | Fujiwara | 152/209 R |
| 5,309,963 | 5/1994 | Kakumu et al. | 152/209 R |
| 5,337,815 | 8/1994 | Graas | 152/209 R |
| 5,580,404 | 12/1996 | Hitzky | 152/209 R |
| 5,643,374 | 7/1997 | Matsumoto | 152/209 R |
| 5,679,185 | 10/1997 | Tanaka | 152/209 R |

FOREIGN PATENT DOCUMENTS

| | | | |
|---|---|---|---|
| 671287 | 9/1995 | European Pat. Off. . | |
| 710577 | 5/1996 | European Pat. Off. . | |
| 2608516 | 6/1988 | France | 152/209 R |
| 5-162512 | 6/1993 | Japan . | |
| 7-40711 | 2/1995 | Japan . | |
| 2221877 | 2/1990 | United Kingdom | 152/209 R |
| WO97/14567 | 4/1997 | WIPO . | |

*Primary Examiner*—Steven D. Maki
*Attorney, Agent, or Firm*—Nikaido, Marmelstein, Murray & Oram LLP

[57] ABSTRACT

One each wide main groove is disposed on each side of a tire equator on a tread surface, the area interposed between these right and left two main grooves is used as ribs, two kinds of large and small sub-grooves having mutually different groove widths and extending from the main grooves to a ground contact end in a tire width-wise direction are disposed alternately in both outside areas of the main grooves throughout one circumference of a tire, and sub-main grooves extending in the tire circumferential direction are disposed between the main grooves and the ground contact end in the tire width-wise direction.

8 Claims, 2 Drawing Sheets

PNEUMATIC RADIAL TIRE INCLUDING MAIN GROOVES AND SUB-GROOVES

TECHNICAL FIELD

This invention relates to a pneumatic radial tire which can drastically improve noise performance while securing excellent wet performance (water draining performance) by two thick main grooves.

BACKGROUND ART

As tires for passenger cars have come to have a low profile in recent years, the ground contact width of the tread surface tends to become greater. However, when the ground contact width of the tread surface becomes great, water draining performance drops. Therefore, a tread pattern so designed as to put particular emphasis on water draining performance has been employed for the low-profile tires. The tread pattern having such high water draining performance generally has a block pattern comprising a plurality of straight main grooves extending on the tread surface in a tire circumferential direction and sub-grooves so extending in a tire width-wise direction as to cross these straight main grooves.

In the block pattern having such a large number of straight main grooves and sub-grooves, however, the pattern noise increases remarkably, and it is extremely difficult to simultaneously secure wet performance and to reduce the pattern noise. Particularly because the grade of the cars has become higher and higher in recent years, the market demand for the reduction of a high frequency pattern noise in the range of 800 to 1,000 Hz has become stronger, but the conventional block patterns cannot reduce such pattern noises.

DISCLOSURE OF THE INVENTION

It is an object of the present invention to provide a pneumatic radial tire which can drastically improve noise performance, and more particularly, can reduce a high frequency pattern noise in the range of 800 to 1,000 Hz, while securing satisfactory wet performance.

The pneumatic radial tire according to the present invention for accomplishing the object described above is characterized in that one each wide main groove having a groove width of at least 10 mm is disposed on each side of a tire equator on the tread surface, the area interposed between these right and left two main grooves is used as ribs, two kinds of large and small sub-grooves having mutually different groove widths and extending from these main grooves toward the ground contact end in a tire width-wise direction are alternately disposed throughout one circumference of the tire in both outside areas of the main grooves, sub-main grooves extending in a tire circumferential direction are disposed between the main grooves and the ground contact end in the tire width-wise direction, and the groove width a of the main grooves, the distance b from the tire equator to the groove center of the main grooves, the ground contact half width W of the tread surface, the groove width cw and the groove depth cd of the sub-groove having a smaller groove width, the groove width dw and the groove depth dd of the sub-grooves having a greater groove width, and the groove depth ed of the sub-main grooves satisfy the following relation:

$0.14 < a/W < 0.2,$ $0.3 < b/W < 0.4,$ $dw \geq 2cw, dw \leq 1.5$ mm, $ed \geq cd, dd$ In the present invention, the term "main groove" represents those grooves which have a groove width of at least 5 mm. As such main grooves, the present invention disposes only two main grooves having a groove width a of at least 10 mm and having a width satisfying the relation described above with respect to the ground contact half width W of the tread surface in such a manner as to interpose the tire equator between them, but does not dispose any other main grooves, in order to improve wet performance. The area interposed between these two main grooves is used as ribs having high rigidity so as to increase the ground contact pressure of the center area of the tread and to secure maneuvering stability during driving on a wet road surface.

On the other hand, two kinds of sub-grooves having mutually different groove widths extending from the main grooves to the ground contact end in the tire width-wise direction are alternately disposed throughout one circumference of the tire so as to improve wet performance and to disperse the noise (pattern noise). Further, the sub-main grooves extending in the tire circumferential direction are disposed to assist the draining role of two kinds of sub-grooves described above. Therefore, not only wet performance can be improved but noise performance (noise reduction) can be improved, as well. Particularly, the pattern noise of the high frequency (800 to 1,000 Hz) can be reduced.

In the present invention, the term "ground contact half width W of the tread surface" represents ½ of the tread surface ground contact width when the tire comes into contact with the road surface at 80% of a design reference load under charging of air at a reference air pressure stipulated by JATMA.

BEST MODE FOR CARRYING OUT THE INVENTION

Figure 3:
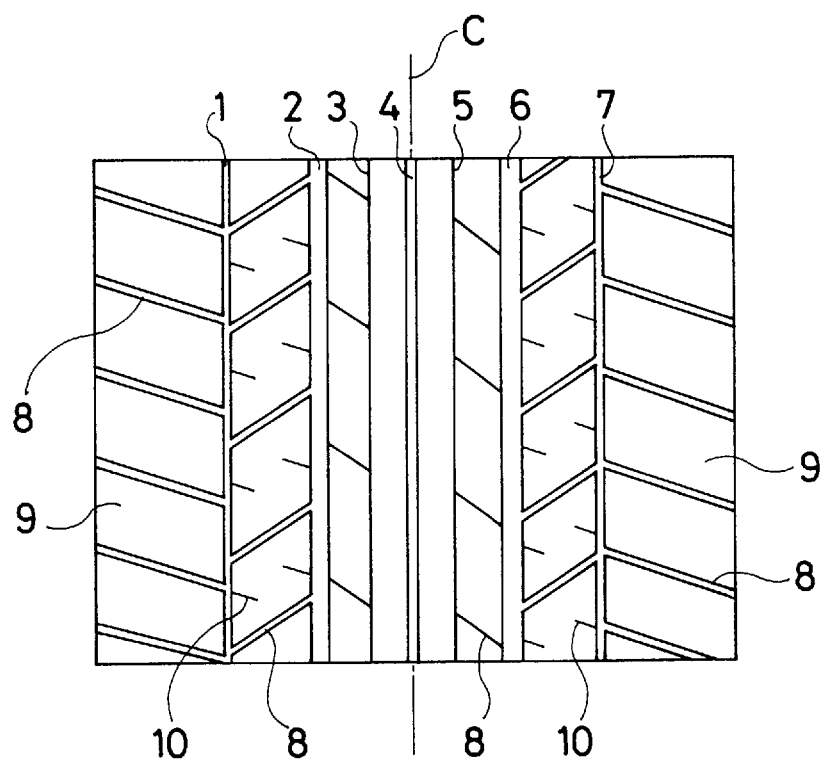
FIG. 3 is a plan view showing an example of the tread pattern of a pneumatic radial tire according to the prior art.

FIG. 3 shows an example of the conventional tread pattern having high draining performance. In this drawing, blocks 9 are defined on the tread surface by seven straight main grooves 1 to 7 and sub-grooves 8 in the tire width-wise direction crossing these straight main grooves. Reference numeral 10 represents kerfs. The arrangement in which the sub-grooves 8 inclined to the tire equator C and crossing the straight main grooves are disposed as described above is advantageous for draining performance. In FIG. 3, however, noise performance drops because a number of straight main grooves is great and the sub-groove width is great, too.

Figure 1:
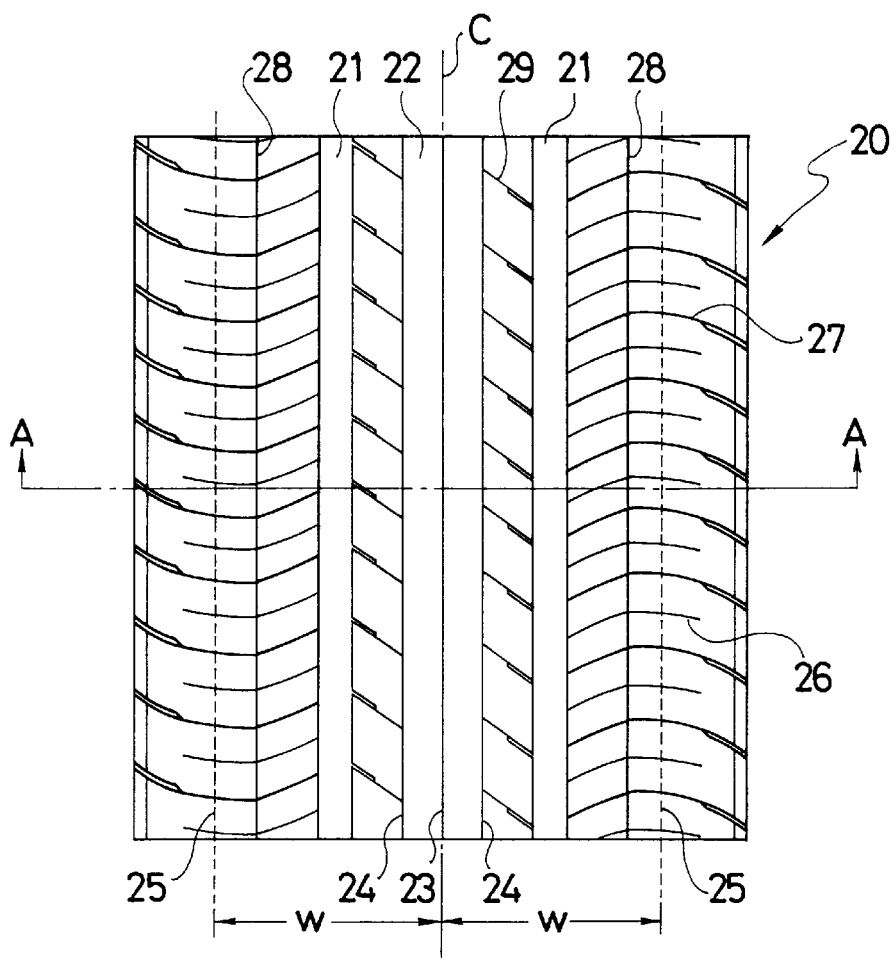
FIG. 1 is a plan view showing an example of the tread pattern of a pneumatic radial tire according to the present invention.
Figure 2:
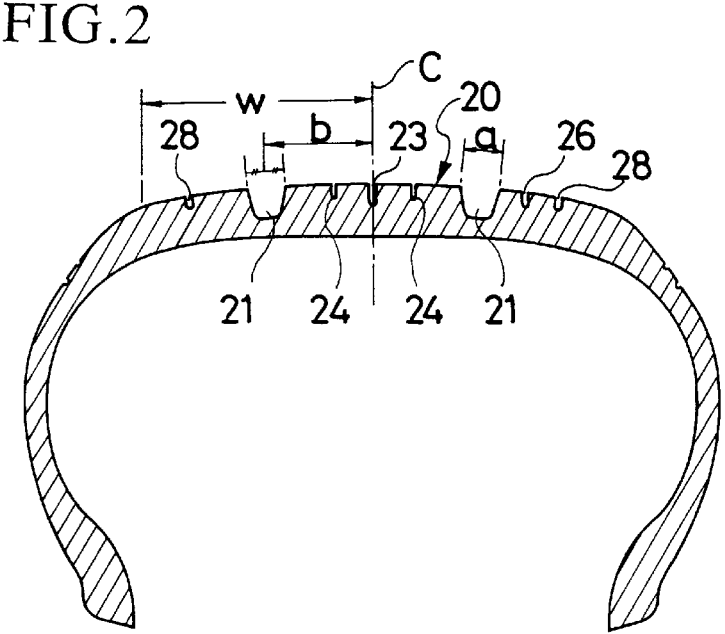
FIG. 2 is a sectional view taken along a line A—A in FIG. 1.

Each of FIGS. 1 and 2 shows an example of the pneumatic radial tire according to the present invention. The internal structure of the pneumatic radial tire of the present invention (disposition structure of a belt layer, a carcass layer, etc) is substantially the same as that of the pneumatic radial tire according to the prior art, and is therefore omitted in FIG. 2.

In FIGS. 1 and 2, only two straight main grooves 21 the groove width of which is by far greater than the main groove width of pneumatic radial tires for passenger cars in general and is at least 10 mm are disposed on the right and left sides of a tire equator C on the tread surface 20. Main grooves, which are defined as those having a groove width of at least 5 mm, other than these straight main grooves 21, are not disposed. A rib 22 having a large width (center rib) are formed between these two main grooves 21. A straight narrow groove 23 may be further disposed round one circumference of the tire at the center of this rib 22. Further, two similar thin grooves 24 may be disposed on both right and left sides of the thin groove 23. Since these thin grooves 23 and 24 have a groove width of less than 5 mm, they do not come under the main groove category as defined in the present invention.

The two main grooves are disposed symmetrically with respect to the tire equator C on the tread pattern of FIG. 1, but they may be disposed asymmetrically. The groove widths of the two main grooves 21 may be equal to each other as shown in the drawing or may be mutually different.

Large and small (two kinds) sub-grooves 26 and 27 having mutually different groove widths are alternately disposed at an arbitrary pitch in an area ranging from the main grooves 21 to the ground contact end 25 in the tire width-wise direction throughout one circumference to the tire (the groove width cw of sub-groove 26<groove width dw of sub-groove 27). These sub-grooves 26 and 27 extend from the main grooves 21 to the ground contact end 25 in the tire width-wise direction, and are open to the main grooves 21 and the ground contact end 25 in the tire width-wise direction, respectively.

Sub-main grooves 28 having a groove width of less than 5 mm and extending in the tire circumferential direction are disposed in the area ranging from the main grooves 21 to the ground contact end 25 in the tire width-wise direction, that is, between the main grooves 21 and the ground contact end 25 in the tire width-wise direction.

Kerfs 29 can be disposed, whenever necessary, in the rib 22 in order to adjust rigidity. In other words, when rigidity of the rib 22 is excessively great in comparison with the area ranging from the main grooves 21 to the ground contact end 25 in the tire width-wise direction, non-uniform wear is likely to occur in the rib 22. Therefore, the kerfs 29 are disposed in the rib 22 to lower the rigidity of the rib 22. Straight thin grooves 23 and 24 disposed at the center of the rib 22, too, adjust the rigidity of the rib 22.

In the tread pattern described above, the wide main groove 21 has a groove width a of at least 10 mm and this width a satisfies the relation 0.14<a/W<0.2 with respect to the tread surface ground contact half width W.

Further, the distance b from the tire equator C to the groove center (in the direction of the normal) of the main groove 21 falls within the range of 0.3<b/W<0.4 with respect to the ground contact half width W.

When the groove width a of the wide main groove 21 is set to a value exceeding 0.14 times the ground contact half width W of the tread surface as described above, only two main grooves 21 can exhibit high draining property. Even if the groove width a is increased to at least 0.2 times the ground contact half width W, however, the effect of the draining property levels off, and maneuvering stability and the wear resistance drop, on the contrary, due to the decrease of the ground contact area. When the groove width a is increased beyond 0.2 times the ground contact half width W, noise performance gets deteriorated because the groove volume increases.

On the other hand, when the distance b from the groove center of the main groove 21 to the tire equator C is greater than 0.3 times the ground contact half width W of the tread surface, the width of the rib 22 can be increased and the ground contact pressure at the tread center area (center portion) can be increased. Therefore, maneuvering stability during driving on a wet road surface can be secured. However, when the distance b is increased beyond 0.4 times the ground contact half width W of the tread surface, the main grooves exist at the positions where the ground contact length on the tread surface in the tire circumferential direction (corresponding to the ground contact length in the tire circumferential direction in the foot print) is short, so that the draining property gets deteriorated. The groove depth of the main groove 21 may be 40 to 70% of the tread thickness.

More concretely, the groove width a of the main groove 21 is preferably 10 to 20 mm and the distance b is preferably 23 to 35 mm.

The groove width cw and groove depth cd of the sub-groove 26 having a smaller groove width and the groove width dw and groove depth dd of the sub-groove 27 having a greater groove width satisfy respectively the relation $dw \geq 2cw$ and $dw \leq 1.5$ mm. When these two kinds of the sub-grooves 26 and 27 satisfying these relations are alternately disposed in the tire circumferential direction, it becomes possible to disperse particularly the pattern noise in the high frequency range (800 to 1,000 Hz) and to reduce the noise. Here, it is preferred concretely that the groove width cw of the sub-groove 26 is 0.4 to 0.75 mm, the groove depth cd is 3 to 8 mm, the groove width dw of the sub-groove 27 is 0.8 to 1.5 mm and the groove depth dd is 3 to 8 mm.

The groove depth ed of the sub-main groove 28 having a groove width of less than 5 mm must be equal to, or greater than, both of the groove depth cd of the sub-groove 26 and the groove depth dd of the sub-groove 27 ($ed \geq cd, dd$). For, this limitation makes the passage of air smooth inside these grooves and can prevent the occurrence of the high frequency sound. In addition, skidding on the wet road surface can be restricted by the improvement of the edge effect. The groove depth ed of the sub-main groove 28 is preferably 5 to 8 mm, and its groove width is preferably 1.0 to 4.0 mm.

The groove area ratio of the tread surface 20 in the present invention may be in the same range as the range of the conventional pneumatic radial tires. The groove area ratio is preferably 25 to 45% and particularly preferably, 27 to 35%.

The tread pattern according to the present invention described above can exhibit particularly remarkable effects when applied to radial tires having a relatively great aspect ratio and a large width. In other words, the aspect ratio is preferably 35 to 80% and particularly preferably, 50 to 70%.

A tread surface ground contact half width W is 40 to 120 mm and preferably, 60 to 100 mm. Incidentally, the tread pattern may be either directional or non-directional (but directional pattern is more advantageous for wet performance).

EXAMPLES (1) Wet performance and noise performance (high frequency pattern noise (P/N) of 800 to 1,000 Hz) were evaluated in the following way for a tire A of the present invention and a conventional tire 1 each having the same tire size 215/65 R15. The result is tabulated in Table 1.

① The present tire A:

The present tire A had the tread pattern shown in FIG. 1. In FIG. 1, the groove width a of the main groove 21=14; the groove depth=8.3 mm; the distance b=30.6 mm; the groove width cw of the sub-groove 26=0.75 mm; the groove depth cd=6.5 mm; the groove width dw of the sub-groove 27=greater than 1.5 mm; the groove depth dd=6.5 mm; the groove depth ed of the sub-main groove 28=6.5 mm; the groove width=2.0 mm.

Table 2, and wet performance and noise performance of these tires were evaluated in the same way as in the item (1). The evaluation results are tabulated in Table 2.

TABLE 2

|  | Tire 1(2) of this invention | Tire 1(2) of this invention | Comp. tire 1 | Comp. tire 2 | Comp. tire 3 | Comp. tire 4 | Comp. tire 5 | Comp. tire 6 | Comp. tire 7 | Comp. tire 8 | Comp. tire 9 |
|---|---|---|---|---|---|---|---|---|---|---|---|
| noise performance | 110 | 105 | 112 | 100 | 98 | 110 | 112 | 108 | 103 | 104 | 103 |
| wet performance | 98 | 103 | 94 | 105 | 98 | 95 | 94 | 94 | 100 | 98 | 100 |
| a/w | 0.16 | 0.19 | 0.14 | 0.2 | 0.16 | 0.16 | 0.16 | 0.16 | 0.16 | 0.16 | 0.16 |
| b/w | 0.35 | 0.35 | 0.35 | 0.35 | 0.35 | 0.35 | 0.3 | 0.4 | 0.35 | 0.35 | 0.35 |
| dw | 1.5 | 1.5 | 1.5 | 1.5 | 1.5 | 1.5 | 1.5 | 1.5 | 1.5 | 1.5 | 1.6 |
| cw | 0.75 | 0.75 | 0.75 | 0.75 | 0.75 | 0.75 | 0.75 | 0.75 | 1.5 | 0.8 | 0.8 |
| sub-main groove, | yes | yes | yes | yes | yes | nil | yes | yes | yes | yes | yes |
| depth ed | ed = cd, dd | ed = cd, dd | ed = cd, dd | ed = cd, dd | ed < cd, dd |  | ed = cd, dd | ed = cd, dd | ed = cd, dd | ed = cd, dd | ed = cd, dd |

(2) Conventional tire 1:

The conventional tire 1 had the tread pattern shown in FIG. 3. In FIG. 3, the groove width of the main groove=3 mm; groove depth 32 6.5 mm; the groove width of the main groove 2=11 mm; the groove depth=8.2 mm; the groove width of the main groove 3=2 mm; the groove depth=6.5 mm; the groove width of the main groove 4=8 mm; the groove depth=8.2 mm; the width of the main groove 5=2 mm; the groove depth=6.5 mm; the groove width of the main groove 6=11 mm; the groove depth=8.2 mm; the groove width of the main groove 7=3 mm; the groove depth=6.5 mm; the groove width of the sub-groove 8=3.0 mm; the groove depth=6.5 mm.

Evaluation method of wet performance:

Draining property on the wet road surface was evaluated. On the wed road surface, the speed was increased on a level ground having a mean water depth of 10 mm and a limit speed till the occurrence of hydroplaning was measured. Evaluation was made by using the index value of the Conventional tire 1 as 100. The greater this index value, higher becomes the draining property.

Noise performance (high frequency P/N)

Feeling evaluation of the pattern noise was conducted by panelists on the test course P/N evaluation road surface (paved road surface similar to ordinary roads). Particularly, the high frequency pattern noise of 800 to 1,000 Hz was mainly evaluated, and was expressed by the index by using the evaluation result of the Conventional tire 1 as 100. The greater this value, the better.

TABLE 1

|  | Conventional tire 1 | Tire A of this invention |
|---|---|---|
| noise performance | 100 | 110 |
| wet performance | 100 | 98 |

As can be understood clearly from Table 1, the tire A of this invention could improve noise performance (could reduce the pattern noise) without substantially deteriorating wet performance in comparison with the conventional tire.

(2) Tires having the same tire size 215/65 R15 (Tires of this invention 1 and 2 and Comparative Tires 1 to 9) and having the tread pattern shown in FIG. 1 were produced by changing variously a/W, b/W, dw, cw and ed as shown in As can be understood from Table 2, the Tires 1 and 2 of the present invention could simultaneously satisfy noise performance and wet performance in comparison with Comparative Tires which failed to satisfy any of the requirements (a/W, b/W, dw, cw and ed), that is, Comparative Tire 1 (a/W=0.14), Comparative Tire 2 (a/W=0.2), Comparative Tire 3 (ed<cd, dd), Comparative Tire 4 (not having sub-main groove), Comparative tire 5 (b/W=0.3), Comparative Tire 6 (b/W=0.4), Comparative Tire 7 (cw=1.5), Comparative Tire 8 (cw=0.8) and Comparative Tire 9 (dw=1.6, cw=0.8). Here, the numerical values of 96 to 104 in noise performance and wet performance represent that performance is substantially equal to the reference value 100, the numerical value exceeding 105 represents that the effect could be obtained, and the numerical value below 95 represents that no effect could be obtained.

As described above, the present invention can simultaneously satisfy noise performance and wet performance by the tread pattern arrangement wherein one each wide main grooves having a groove width of at least 10 mm is disposed on each side of a tire equator on the tread surface, the area interposed between these right and left two main grooves is used as ribs, two kinds of large and small sub-grooves having mutually different groove widths and extending from the main grooves toward the ground contact end in a tire width-wise direction are alternately disposed throughout one circumference of the tire in both outside areas of the main grooves, sub-main grooves extending in a tire circumferential direction are disposed between the main grooves and the ground contact end in the tire width-wise direction, and the groove width a of the main grooves, the distance b from the tire equator to the groove center of the main grooves, the ground contact half width W of the tread surface, the groove width cw and the groove depth cd of the sub-groove having a smaller groove with, the groove width dw and the groove depth dd of the sub-groove having a greater groove width, and the groove depth ed of the sub-main grooves satisfy a specific relation.

What is claimed is:

1. A pneumatic radial tire characterized in that one wide main groove having a groove width of at least 10 mm is disposed on each side of a tire equator on a tread surface, the area interposed between the two main grooves includes a rib, two kinds of large and small sub-grooves having mutually different groove widths and extending from a main groove toward a ground contact end in a tire width-wise direction are alternately disposed throughout one circumference of said tire in each outside area betwen a main groove and a ground contact end, sub-main grooves extending in a tire circumferential direction are disposed between a main groove and a ground contact end in the tire width-wise direction in each outside area, and the groove width a of each main groove, the distance b from the tire equator to the groove center of a main groove, the ground contact half width W of the tread surface, the groove width cw and the groove depth cd of each sub-groove having a smaller groove width, the groove width dw and the groove depth dd of each sub-groove having a greater groove width, and the groove depth ed of said sub-main grooves satisfy the following relations:

$0.14 < a/W < 0.2$, $0.3 < b/W < 0.4$, $dw \geq 2cw$, $dw \leq 1.5$ mm, and $ed \geq cd, dd$.

2. A pneumatic radial tire according to claim 1, wherein the groove width of each sub-main groove is 1.0 to 4.0 mm.

3. A pneumatic radial tire according to claim 1, wherein the groove width a of each main groove is 10 to 20 mm.

4. A pneumatic radial tire according to claim 1, wherein the distance b from the tire equator to the groove center of said main groove is 23 to 35 mm.

5. A pneumatic radial tire according to claim 1, wherein said ground contact half width W of said tread surface is 60 to 100 mm.

6. A pneumatic radial tire according to claim 1, wherein the groove width cw of each sub-groove having a smaller groove width is 0.4 to 0.75 mm, and its groove depth cd is 3 to 8 mm.

7. A pneumatic radial tire according to claim 1, wherein the groove width dw of each sub-groove having a greater groove width is 0.8 to 1.5 mm and its groove depth dd is 3 to 8 mm.

8. A pneumatic radial tire according to claim 1 or 2, wherein the groove depth ed of each sub-main groove is 5 to 8 mm.

* * * * *